United States Patent
Kanesaka

(10) Patent No.: US 7,430,007 B2
(45) Date of Patent: Sep. 30, 2008

(54) DRIVE METHOD OF CCD COLOR IMAGE SENSOR AND COLOR IMAGE INPUT APPARATUS FOR REALIZING AN ELECTRONIC SHUTTER FUNCTION

(75) Inventor: Yoshinori Kanesaka, Nagano (JP)

(73) Assignee: Seiko Epson Corporation, Tokyo (JP)

(*) Notice: Subject to any disclaimer, the term of this patent is extended or adjusted under 35 U.S.C. 154(b) by 612 days.

(21) Appl. No.: 10/777,928

(22) Filed: Feb. 11, 2004

(65) Prior Publication Data
US 2004/0218236 A1    Nov. 4, 2004

(51) Int. Cl.
H04N 3/14    (2006.01)
H04N 5/335   (2006.01)

(52) U.S. Cl. .................. 348/314; 348/316; 348/296

(58) Field of Classification Search .............. 348/295, 348/296, 297, 299, 303, 304, 311, 312, 316, 348/319, 314, 294, 298, 321, 324, 248; 358/513, 358/482, 483, 906
See application file for complete search history.

(56) References Cited

U.S. PATENT DOCUMENTS 5,382,978 A * 1/1995 Tanaka ..................... 348/312
5,526,048 A * 6/1996 Yamamoto ............... 348/223.1

FOREIGN PATENT DOCUMENTS

JP    5-268410    10/1993
JP    2000-32216   1/2000

* cited by examiner

Primary Examiner—Lin Ye
Assistant Examiner—Nelson D Hernández
(74) Attorney, Agent, or Firm—John J. Penny, Jr.; Edwards Angell Palmer & Dodge LLP

(57) ABSTRACT

A drive method of a CCD color image sensor for realizing an electronic shutter function with the signal charge accumulation time varying from one color to another according to a simple structure is provided. Unnecessary charges occurring in photoelectric conversion element groups of colors are transferred in shift registers in the time period in which signal charges are accumulated in the photoelectric conversion element groups of at least colors of R, G, and B ($t_2<t<t_5$), and the signal charges accumulated in the photoelectric conversion element groups of colors in response to different time periods according to the colors set in the photoelectric conversion element groups of colors (R: $t_4<t<t_5$, G: $t_3<t<t_5$, and B: $t_2<t<t_5$) are transferred in the shift registers in the time period in which unnecessary charges are accumulated in the photoelectric conversion element groups of colors ($t_0<t<t_1$).

2 Claims, 14 Drawing Sheets

DRIVE METHOD OF CCD COLOR IMAGE SENSOR AND COLOR IMAGE INPUT APPARATUS FOR REALIZING AN ELECTRONIC SHUTTER FUNCTION

BACKGROUND OF THE INVENTION

This invention relates to a drive method of a CCD color image sensor and a color image input apparatus.

Hitherto, an image sensor has been widely used as an image pickup device for outputting an electric signal responsive to light and shade of an optical image by executing photoelectric conversion. As a kind of image sensor, a CCD color image sensor is known. The CCD color image sensor includes photoelectric conversion elements and a shift register. The photoelectric conversion elements are provided with predetermined color filters of R (Red), G (Green), B (Blue), etc., and receive light passed through the filters and accumulate charges responsive to the light reception amounts. The charges generated in each photoelectric conversion element are transferred to the shift register as a shift gate is open, and the shift register outputs the charges to an output section by CCD.

By the way, the CCD color image sensor is installed in a color image input apparatus of an image scanner, a copier, etc., for example, as an image pickup device. The color image input apparatus scans and reads an optically transparent sheet of a negative film, a positive film, etc., on which an image is formed (which will be hereinafter referred to as transparent original) and a light reflection sheet of print paper, photographic paper, etc., on which an image is formed (which will be hereinafter referred to as reflection original) by the CCD color image sensor. At this time, to read a negative film, for example, the negative film has nature being the hardest to allow B (Blue) light of three prime colors to pass through and thus the accumulation time of signal charges is prolonged as for the photoelectric conversion element provided with the B filter.

An electronic shutter is publicly known as a technique of changing the charge accumulation time of the photoelectric conversion element as desired. The electronic shutter is a technique to discard unnecessary charges occurring in the photoelectric conversion elements outside the time period for accumulating charges (signal charges) to be taken out as an output signal. FIG. 14 shows a configuration example of a CCD color image sensor 200 adopted in a related art to implement the electronic shutter. The CCD color image sensor 200 is a linear image sensor and includes a plurality of rows of linear photoelectric conversion element groups 204 each consisting of a plurality of photoelectric conversion elements 202 provided with filters of the same color. The CCD color image sensor 200 is provided linearly with a shift gate 206, a shift register 208, a shutter gate 210, and a drain 212 along each row of the linear photoelectric conversion element groups 204.

When signal charges are accumulated in the CCD color image sensor 200, the shift gate 206 and the shutter gate 210 are shut. When signal charges are read from the CCD color image sensor 200, the shift gate 206 is opened and the signal charges are transferred to the shift register 208 after the signal charges are accumulated. In the time period until accumulation of the signal charges is again started after the signal charges are transferred to the shift register 208, the shift gate 206 is shut and on the other hand, the shutter gate 210 is opened and charges (unnecessary charges) occurring in the photoelectric conversion elements are discarded to the drain 212.

In the CCD color image sensor 200 in the related art, however, the photoelectric conversion element group 204 of each color is provided with the shutter gate 210 and the drain 212 for discarding the unnecessary charges and thus the structure becomes complicated and an increase in the manufacturing cost is incurred.

SUMMARY OF THE INVENTION

The invention is embodied considering the problems and it is an object of the invention to provide a drive method of a CCD color image sensor for realizing an electronic shutter function with the signal charge accumulation time varying from one color to another according to a simple structure.

It is another object of the invention to provide a color image input apparatus for realizing an electronic shutter function with the signal charge accumulation time varying from one color to another according to a simple structure in a CCD color image sensor.

According to the invention, there is provided a drive method of a CCD color image sensor, including the steps of transferring unnecessary charges in a photoelectric conversion element group of each color in a shift register and then opening a shift gate of each color and transferring signal charges in the photoelectric conversion element group of each color to the shift register; during the time period of transferring the signal charges in the photoelectric conversion element group of each color in the shift register, shutting the shift gate of each color and accumulating unnecessary charges in the photoelectric conversion element group of each color; opening the shift gate of each color and transferring the unnecessary charges occurring in the photoelectric conversion element group of each color to the shift register; and shutting the shift gates of colors in order and continuing to shut each of the shift gates in response to the time period set for each color, thereby accumulating the signal charges in the photoelectric conversion element group of each color. According to the drive method, the signal charges can be accumulated in the time period set for each color and in addition, the unnecessary charges can be discarded by the shift register. Therefore, according to the drive method, the electronic shutter function with the signal charge accumulation time varying from one color to another can be realized according to a simple structure without providing a drain, etc.

The expression "photoelectric conversion element group of each color" in the description is used to mean a photoelectric conversion element group for receiving light passed through the filters of the same color. However the photoelectric conversion element group of each color may be made up of a plurality of adjacent photoelectric conversion elements or may be made up of a plurality of unadjacent photoelectric conversion elements with a photoelectric conversion element forming a part of a photoelectric conversion element group of another color between. The expression "shift gate of each color" is used to mean a shift gate provided for each photoelectric conversion element group of each color.

According to the invention, there is provided a drive method of a CCD color image sensor, including the steps of transferring unnecessary charges occurring in a photoelectric conversion element group of each color in a shift register in a time period of accumulating signal charges in the photoelectric conversion element group of each color; and transferring the signal charges accumulated in the photoelectric conversion element group of each color in response to a different time period for each color set in the photoelectric conversion element group of each color in the shift register in the time period of accumulating the unnecessary charges in the photoelectric conversion element group of each color. According to the drive method, the signal charges can be accumulated in different time periods according to the colors and in addition, using the accumulation time period of the signal charges, the unnecessary charges can be transferred in the shift register and discarded. Therefore, according to the drive method, the electronic shutter function with the signal charge accumulation time varying from one color to another can be realized according to a simple structure.

According to the invention, there is provided a color image input apparatus including a CCD color image sensor having a photoelectric conversion element group of each color, a shift gate of each color, and a shift register of each color; means for transferring unnecessary charges in the photoelectric conversion element group of each color to the shift register and then opening the shift gate of each color and transferring signal charges in the photoelectric conversion element group of each color to the shift register; means for, during the time period of transferring the signal charges in the photoelectric conversion element group of each color to the shift register, shutting the shift gate of each color and accumulating unnecessary charges in the photoelectric conversion element group of each color; means for opening the shift gate of each color and transferring the unnecessary charges occurring in the photoelectric conversion element group of each color to the shift register; and means for shutting the shift gates of colors in order and continuing to shut each of the shift gates in response to the time period set for each color, thereby accumulating the signal charges in the photoelectric conversion element group of each color. According to the color image input apparatus, in the CCD color image sensor, the signal charges can be accumulated in the time period set for each color and in addition, the unnecessary charges can be discarded by the shift register. Therefore, in the color image input apparatus, in the CCD color image sensor, the electronic shutter function with the signal charge accumulation time varying from one color to another can be realized according to a simple structure.

According to the invention, there is provided a color image input apparatus including a CCD color image sensor having a photoelectric conversion element group of each color and a shift register of each color; means for transferring unnecessary charges occurring in a photoelectric conversion element group of each color in a shift register in a time period of accumulating signal charges in the photoelectric conversion element group of each color; and means for transferring the signal charges accumulated in the photoelectric conversion element group of each color in response to a different time period for each color set in the photoelectric conversion element group of each color in the shift register in the time period of accumulating the unnecessary charges in the photoelectric conversion element group of each color. According to the color image input apparatus, in the CCD color image sensor, the signal charges can be accumulated in different time periods according to the colors and in addition, using the accumulation time period of the signal charges, the unnecessary charges can be discarded by the shift register. Therefore, in the color image input apparatus, in the CCD color image sensor, the electronic shutter function with the signal charge accumulation time varying from one color to another can be realized according to a simple structure.

BRIEF DESCRIPTION OF THE DRAWINGS

FIG. 5A is a longitudinal sectional view and FIG. 5B is a transverse sectional view.

DETAILED DESCRIPTION OF PREFERRED EMBODIMENTS

An embodiment indicating a mode for carrying out the invention will be discussed with reference to the accompanying drawings.

Figure 2:
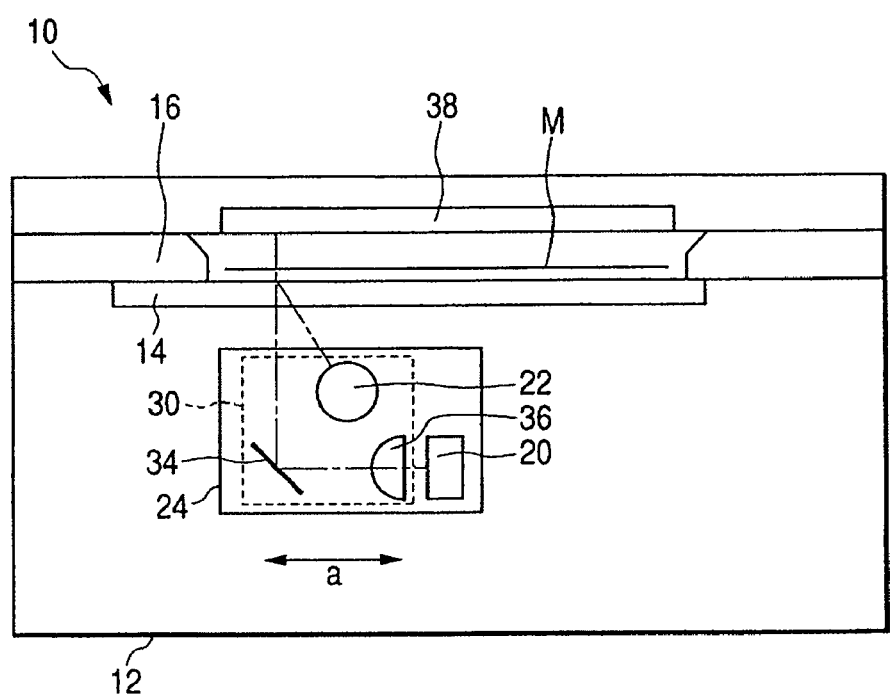
FIG. 2 is a block diagram to show an image scanner according to the embodiment of the invention.

FIG. 2 is a schematic drawing to show the structure of an image scanner 10 of one embodiment of a color image input apparatus according to the invention. The image scanner 10 is a flat-bed image scanner including an original bed 14 on the top of a cabinet 12.

The original bed 14 is formed of a transparent plate of a glass plate, etc., and an original M is placed on the plate face of the original bed 14. An original guide 16 for positioning the original M on the plate face of the original plate 14 is placed in the margins of the original bed 14.

An optical system 30 is made up of a transparent original light source 38, a reflection original light source 22, a mirror 34, a condenser lens 36, etc. The transparent original light source 38 is a surface light source unit. The reflection original light source 22 is made of tube illumination of a fluorescent tube lamp, etc., and is mounted on a carriage 24 in an attitude of extending in a main scanning direction. As indicated by alternate long and short dashed lines in FIG. 2, a transparent light image on the transparent original M applied to the transparent original light source 38 and a reflected light image on the reflection original M applied to the reflection original light source 22 are formed on a CCD color image sensor 20 through the mirror 34, the condenser lens 36, etc.

The CCD color image sensor 20 accumulates charges provided by executing photoelectric conversion of received light for a predetermined time and outputs an electric signal responsive to the light reception amount. The CCD color image sensor 20 used in the embodiment is a linear image sensor of lens reduction type, but a close-contact linear image sensor or a close-contact area image sensor may be used. The CCD color image sensor 20 is mounted on the carriage 24 in an attitude in which a plurality of photoelectric conversion elements 50 are arranged linearly in a perpendicular direction to the plane of FIG. 2. The direction in which the photoelectric conversion elements 50 are arranged is the main scanning direction.

The carriage 24 is housed in the cabinet 12 so that it can be reciprocated in parallel with the plate face of the original bed glass 14. The optical system 30 and the CCD color image sensor 20 are mounted on the carriage 24. The carriage 24 is slidably retained in a guide shaft, etc., parallel with the plate face of the original bed glass 14. The length direction axis of the guide shaft is extended in the direction of a in FIG. 2. The carriage 24 is pulled by a belt, for example, and transports the CCD color image sensor 20 and the optical system 30 in the direction of a in FIG. 2.

Figure 3:
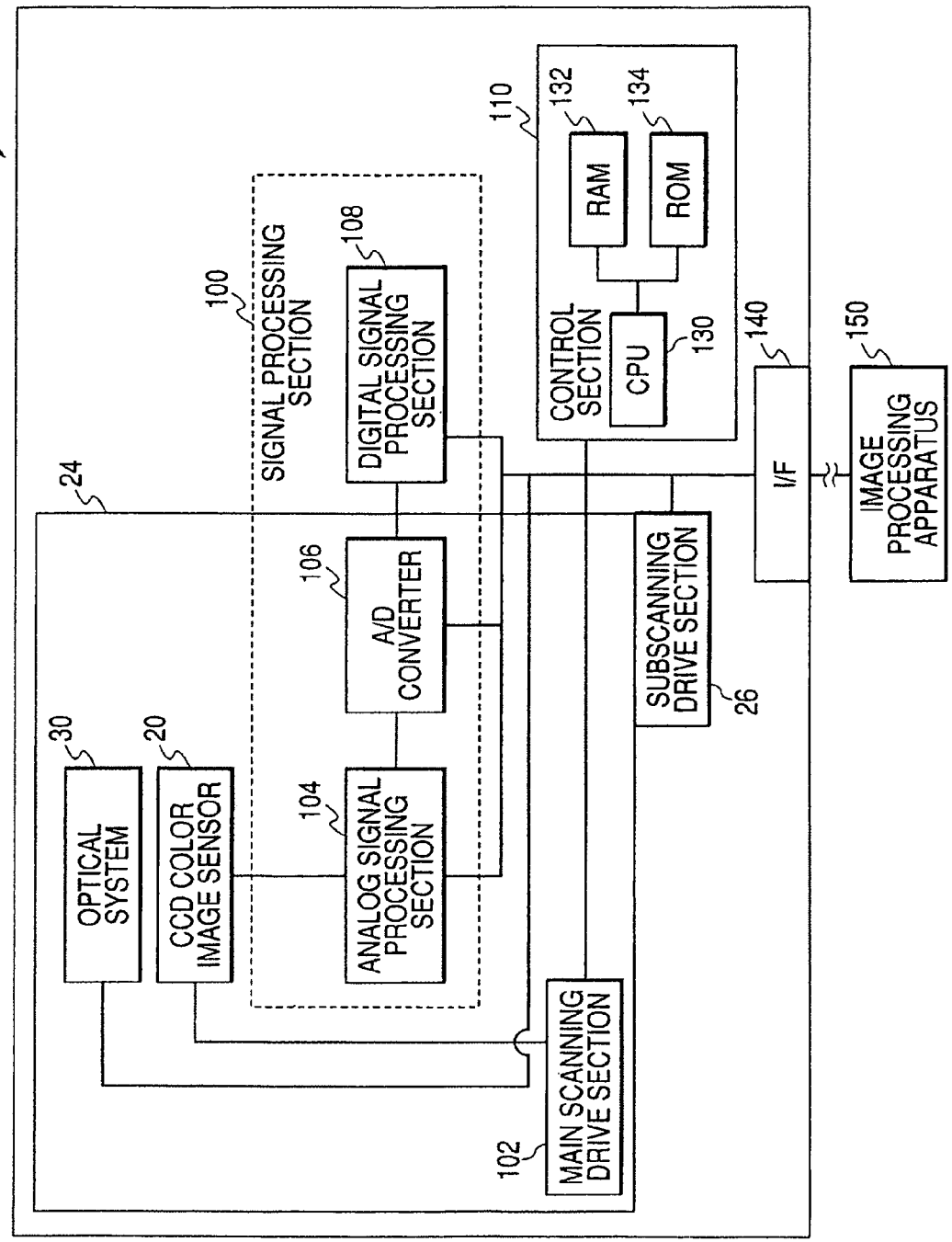
FIG. 3 is a sectional view to schematically show the image scanner according to the embodiment of the invention.

FIG. 3 is a block diagram to show the image scanner 10.

A main scanning drive section 102 generates a pulse required for driving the CCD color image sensor 20 and outputs the pulse to the CCD color image sensor 20. The main scanning drive section 102 is made up of a synchronizing signal generator, a drive timing generator, etc., for example.

A subscanning drive section 26 includes a belt retained in the carriage 24, a motor and a gear train for turning the belt, a drive circuit, etc. The subscanning drive section 26 pulls the carriage 24 by the belt, whereby the main scanning line extending in the perpendicular direction to the plane of FIG. 2 moves in the a direction perpendicular to the main scanning line, so that scanning a two-dimensional image is made possible.

A signal processing section 100 is made up of an analog signal processing section 104, an A/D converter 106, a digital signal processing section 108, etc. The analog signal processing section 104 performs analog signal processing of amplification, noise reduction processing, etc., for an analog electric signal output from the CCD color image sensor 20 and outputs the processed signal to the A/D converter 106. The A/D converter 106 quantizes the analog electric signal output from the analog signal processing section 104 to provide a digital image signal with a predetermined gradation and outputs the image signal to the digital signal processing section 108. The digital signal processing section 108 performs various types of processing such as shading correction, gamma correction, and pixel interpolation for the image signal output from the A/D converter 106 to generate image data to be transferred to an image processing apparatus 150. The various types of processing performed by the digital signal processing section 108 may be replaced with computer program processing executed by a control section 110 or the image processing apparatus 150.

The control section 110 is implemented as a microcomputer including a CPU 130, RAM 132, and ROM 134, and is connected to drive circuits of the light sources 38 and 22, the main scanning drive section 102, the subscanning drive section 26, the signal processing section 100, etc., by a bus. The control section 110 executes a computer program stored in the ROM 134 in response to a command from the image processing apparatus 150 and controls the light sources 38 and 22, the main scanning drive section 102, the subscanning drive section 26, the signal processing section 100, etc.

The image scanner 10 includes an interface (I/F) 140 connected to the control section 110 by the bus in addition to the components described above. The image processing apparatus 150 such as a personal computer can be connected to the I/F 140 and the control section 110 transfers the image data output from the processing section 100 through the I/F 140 to the image processing apparatus 150.

Figure 4:
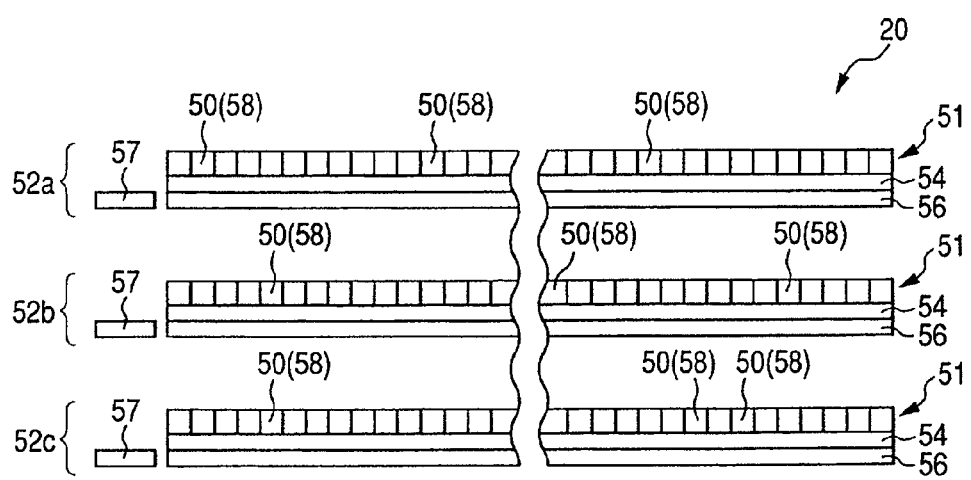
FIG. 4 is a plan view to schematically show the CCD color image sensor according to the embodiment of the invention.
Figure 5A:
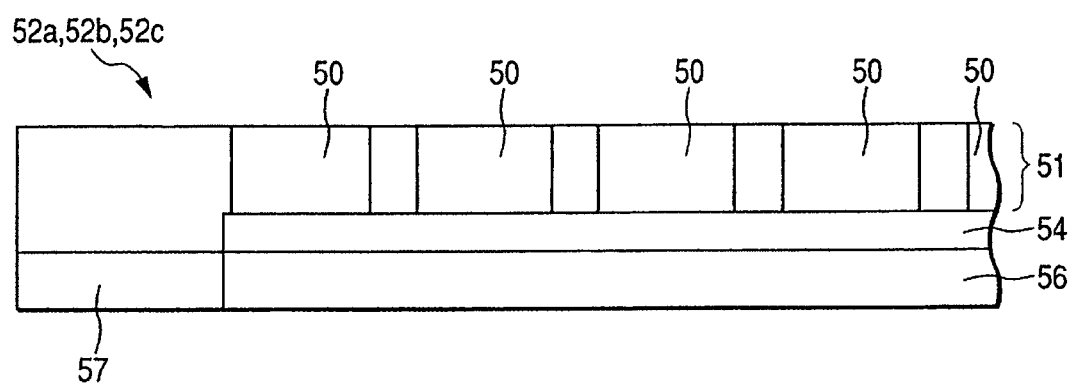
FIGS. 5A and 5B are schematic drawings to show each sensor section of the CCD color image sensor shown in FIG. 4.
Figure 5B:
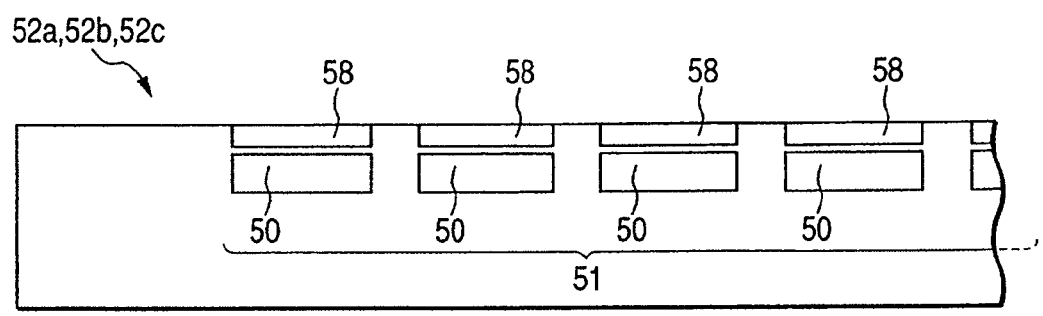

FIGS. 4, 5A and 5B are schematic drawings to show the structure of the CCD color image sensor 20. The CCD color image sensor 20 has three rows of sensor sections 52a, 52b, and 52c extended linearly and placed in parallel with each other on a single chip, the sensor sections 52a, 52b, and 52c being formed with on-chip R (Red), G (Green), and B (Blue) filter arrays. In the description that follows, the sensor section 52a-52c provided with the filter array of each color may be called the sensor section 52a-52c of each color. The number of rows of the sensor sections may be six, etc., for example, as well as three. In response to the number of rows of the filter sections 52, C (Cyan), M (Magenta), and Y (Yellow) or C, M, Y, and G (green) filter arrays may be formed or the sensor section 52 of one row may be formed with a filter array consisting of filters of two or more colors. As the color output technique, for example, a dichroic mirror technique as well as on-chip technique may be adopted.

The sensor section 52a-52c of each color of the CCD color image sensor 20 includes a plurality of photoelectric conversion elements 50, a shift gate 54, a shift register 56, and an output section 57.

The plurality of photoelectric conversion elements 50 are arranged linearly in the extension direction in each sensor section 52a-52c. A color filter 58 forming a part of the R, G, or B filter array is placed on the light reception face of each photoelectric conversion element 50. Each photoelectric conversion element 50 is a photodiode, for example; it receives light passed through the color filter, generates charges responsive to the light reception amount by executing photoelectric conversion, and accumulates the charges for a predetermined time. A photoelectric conversion element group 51 of each color of R, G, and B is made up of the plurality of photoelectric conversion elements 50 making up each sensor section 52a, 52b, 52c.

The shift gate 54 controls whether the charges generated in the photoelectric conversion element group 51 (photoelectric conversion elements 50) are to be transferred to the shift register 56 or to be accumulated in the photoelectric conversion element group 51. The shift gate 54 extends in parallel to the main scanning direction axis along the row of the photoelectric conversion element group 51. A shift gate pulse $\phi S$ (see FIGS. 1A to 1C) can be applied to the shift gate 54 by the main scanning drive section 102. When the shift gate pulse $\phi S$ is applied, as a potential gradient is formed, the shift gate 54 is opened, transferring the charges generated in the photoelectric conversion element group 51 (photoelectric conversion elements 50) to the shift register 56. When no shift gate pulse $\phi S$ is applied, the shift gate 54 is shut, whereby the charges generated in the photoelectric conversion element group 51 (photoelectric conversion elements 50) are accumulated in the photoelectric conversion element group 51.

The shift register 56 transfers the charges generated in the photoelectric conversion element group 51 and transferred by the shift gate 54 to the output section 57. The shift register 56 is adjacent to the shift gate and extends in parallel to the main scanning direction axis. A drive pulse $\phi D$ can be applied to a plurality of electrodes of the shift register 56 by the main scanning drive section 102. The shift register 56 transfers the charges in response to application of the drive pulse φD. The transfer direction of the charges matches the extension direction of the shift register 56.

The output section 57 converts the charges transferred from the shift register 56 into an electric signal and outputs the electric signal. The output section 57 is placed in a side end part in the charge transfer direction of the shift register 56. The charges are transferred from the shift register 56 to the output section 57 in response to the pulse applied from the main scanning drive section 102, and the output section 57 outputs the electric signal responsive to the transferred charges to the signal processing section 100. At the timing at which the signal to be taken out as an image signal is output, the signal output from the output section 57 is input to the signal processing section 100. The charges corresponding to the signal to be taken out as an image signal are signal charges, and the charges corresponding to a signal not taken out as an image signal are unnecessary charges.

Figure 1:
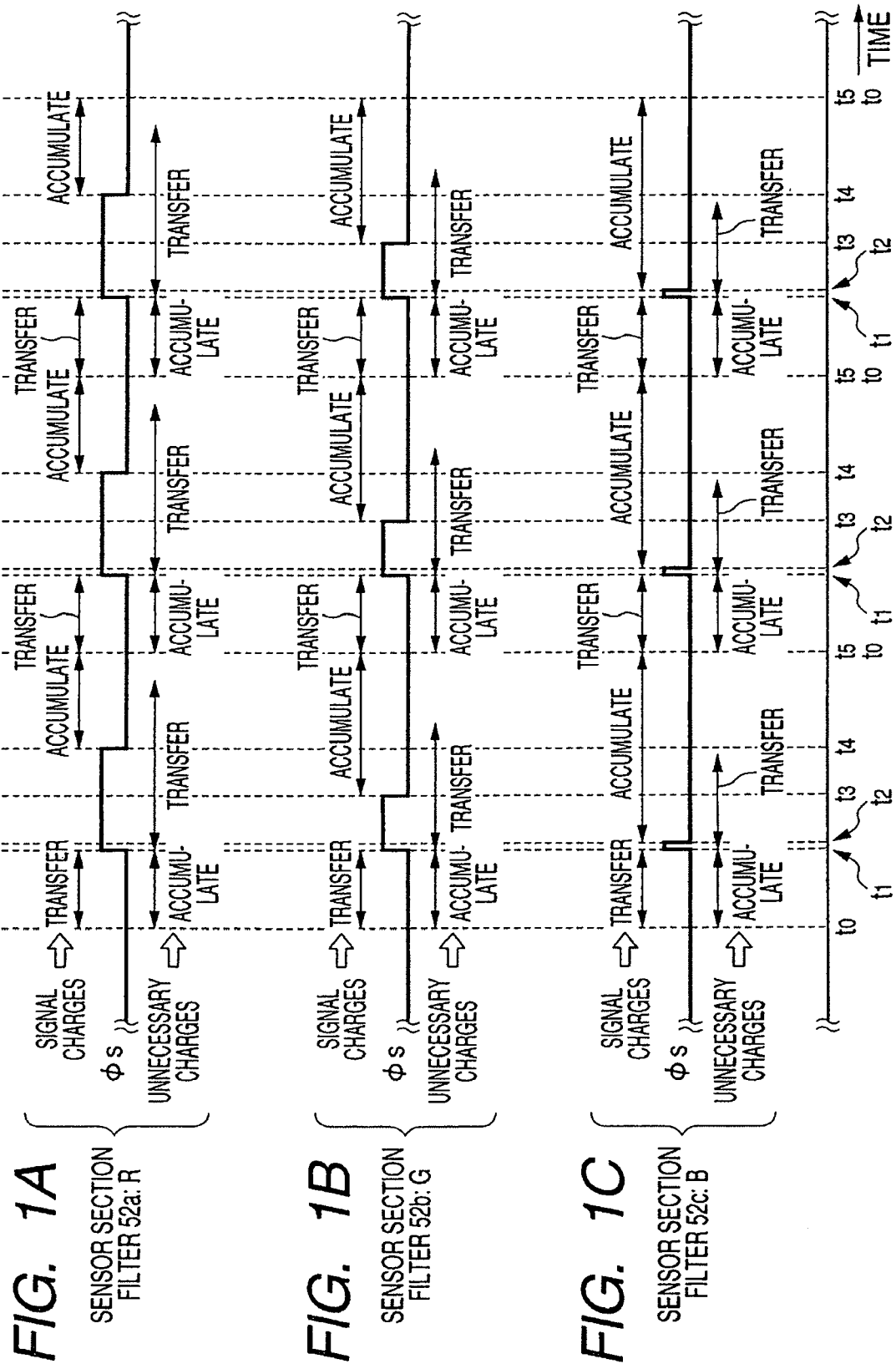
FIGS. 1A to 1C are graphs to describe a method of applying shift gate pulses to a CCD color image sensor according to one embodiment of the invention.

Next, a drive method of the CCD color image sensor 20 by the main scanning drive section 102 will be discussed. FIGS. 1A to 1C show how a shift gate pulse φS and a drive pulse φD (not shown) are applied to each sensor section 52a-52c and signal charges and unnecessary charges are accumulated and are transferred in time sequence. The description that follows starts at a state of $t=t_0$ in which signal charges are accumulated in the photoelectric conversion element group 51 of each sensor section 52a-52c after transfer of unnecessary charges described later.

Figure 6A:
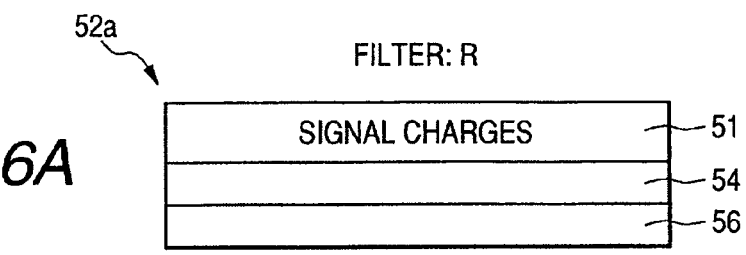
FIGS. 6A to 6C are schematic drawings to describe a drive method of the CCD color image sensor according to the embodiment of the invention.
Figure 6B:
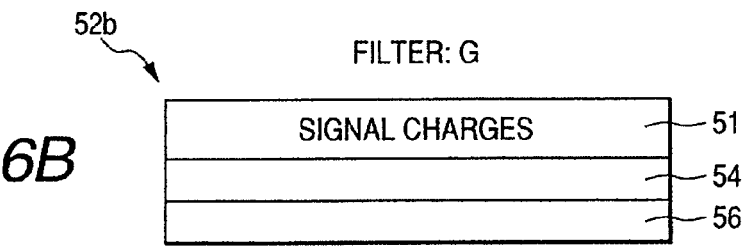
Figure 6C:
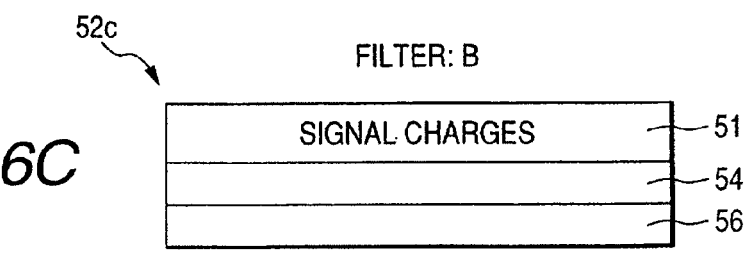
Figure 7A:
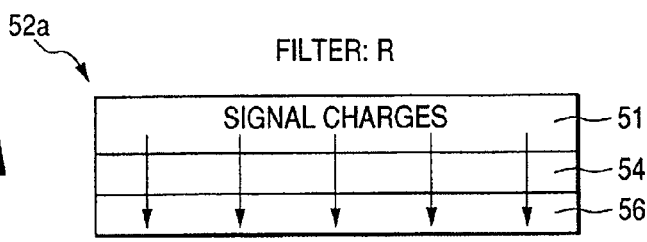
FIGS. 7A to 7C are schematic drawings to describe the drive method of the CCD color image sensor according to the embodiment of the invention.
Figure 7B:
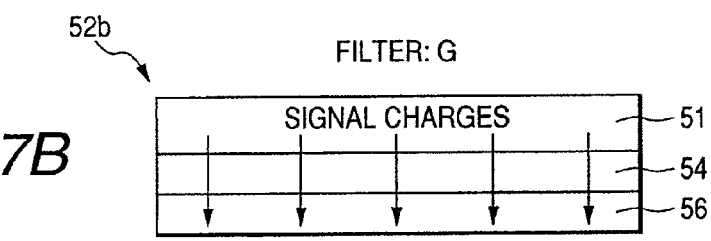
Figure 7C:
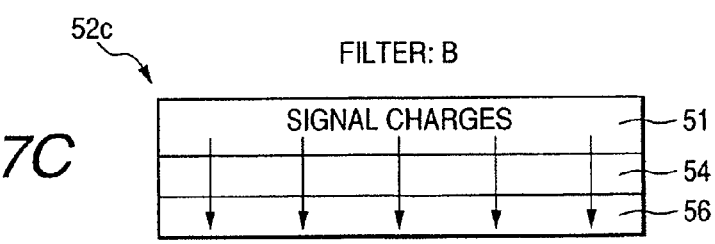

(1) At $t=t_0$, shift gate pulses φS are applied to the shift gates 54 of the sensor sections 52a to 52c of colors at the same time. Accordingly, the shift gates 54 of the sensor sections 52a to 52c of colors are all opened and the signal charges accumulated in the photoelectric conversion element groups 51 of the sensor sections 52a to 52c as shown in FIGS. 6A to 6C are transferred in union to the shift registers 56 as shown in FIGS. 7A to 7C. As the application time (pulse width) of the shift gate pulse φS, the time required for transferring all signal charges can be set appropriately for each of the sensor sections 52a to 52c of colors; for example, a uniform minute time (width) may be set for the sensor sections 52a to 52c of colors. As the application start timing to of the shift gate pulse φS to the shift gate 54, a different timing may be set for each of the sensor sections 52a to 52c of colors.

Figure 8A:
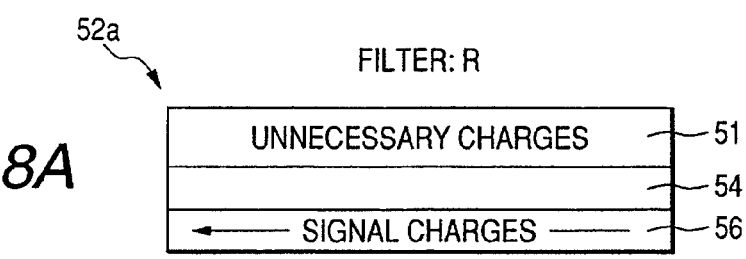
FIGS. 8A to 8C are schematic drawings to describe the drive method of the CCD color image sensor according to the embodiment of the invention.
Figure 8B:
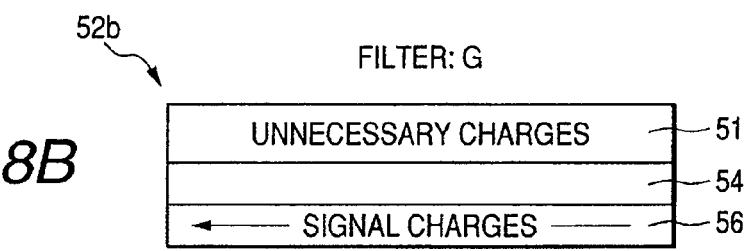
Figure 8C:
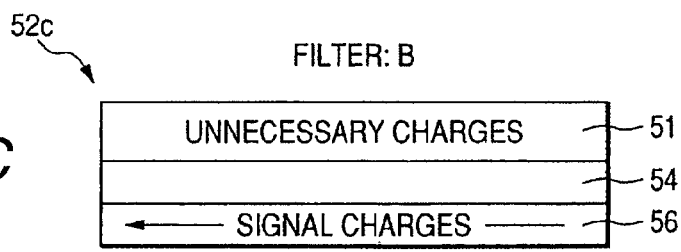

(2) In the time period of $t_0<t<t_1$, drive pulses φD are applied to the shift registers 56 of the sensor sections 52a to 52c of colors in a predetermined sequence. Accordingly, in the shift registers 56 of the sensor sections 52a to 52c of colors, the signal charges transferred in (1) above are transferred to the output sections 57 as shown in FIGS. 8A to 8C. Therefore, in the time period of $t_0<t<t_1$, in the sensor sections 52a to 52c of colors, the electric signals responsive to the signal charges are output from the output ends of the output sections 57. As the drive pulses φD, drive pulses of four phases, two phases, etc., for example, although not shown can be used.

In the time period of $t_0<t<t_1$, no shift gate pulses φS are applied to the shift gates 54 of the sensor sections 52a to 52c of colors. Accordingly, the shift gates 54 of the sensor sections 52a to 52c of colors are all shut and charges (unnecessary charges) are accumulated in the photoelectric conversion element groups 51 of the sensor sections 52a to 52c as shown in FIGS. 8A to 8C.

Figure 9A:
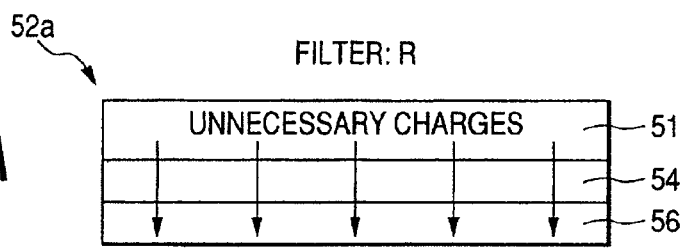
FIGS. 9A to 9C are schematic drawings to describe the drive method of the CCD color image sensor according to the embodiment of the invention.
Figure 9B:
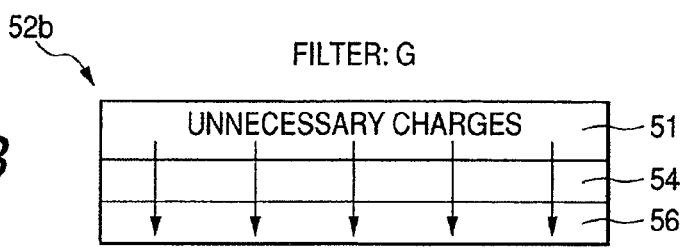
Figure 9C:
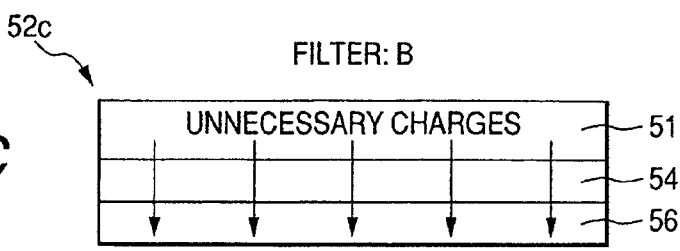

(3) At $t=t_1$ after all signal charges transferred to the shift registers 56 in (1) above are transferred to the output sections 57 of all of the sensor sections 52a to 52c, the shift gate pulses φS are applied to the shift gates 54 of the sensor sections 52a to 52c of colors at the same time. Accordingly, the shift gates 54 of the sensor sections 52a to 52c of colors are all opened and the unnecessary charges accumulated in the photoelectric conversion element groups 51 of the sensor sections 52a to 52c are transferred in union to the shift registers 56 as shown in FIGS. 9A to 9C. As the application start timing $t_1$ of the shift gate pulse φS to the shift gate 54, a different timing may be set for each of the sensor sections 52a to 52c of colors in response to the time required for transferring all signal charges in (2) above.

Figure 10A:
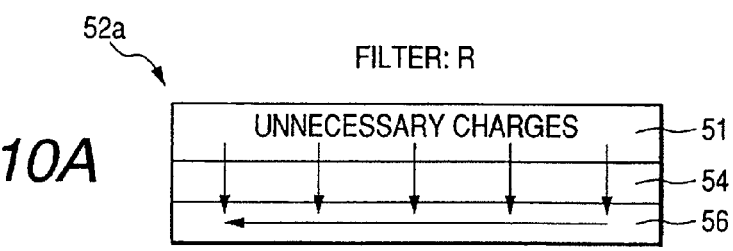
FIGS. 10A to 10C are schematic drawings to describe the drive method of the CCD color image sensor according to the embodiment of the invention.
Figure 10B:
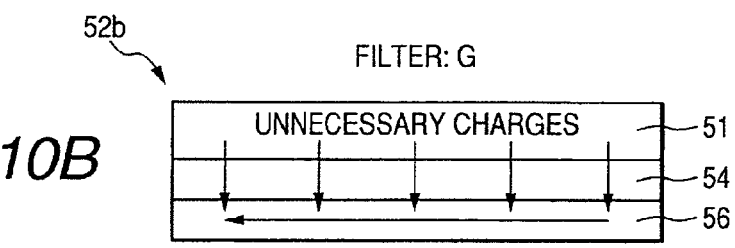
Figure 10C:
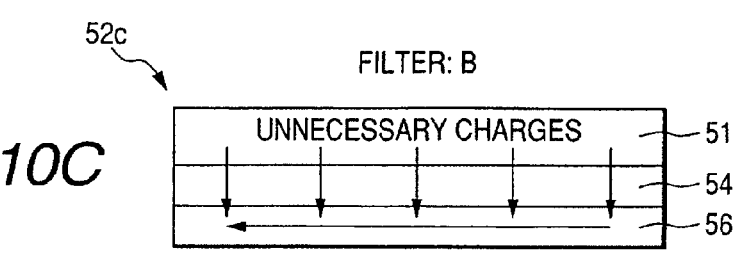

(4) In the time period of $t_1<t<t_5$, in the sensor section 52a-52c of each color, application of the shift gate pulse φS to the shift gate 54 is continued only for a different time and then is stopped only for a different time. In the embodiment, for example, to read a negative film as the original M, the application continuation time of the shift gate pulse φS is set so that the charge accumulation times in the sensor sections 52a, 52b, and 52c of R, G, and B colors are prolonged in this order (namely, in the order of R, G, and B). The drive method of the CCD color image sensor 20 in the time period of $t_1<t<t_5$ will be discussed in detail below by taking reading of a negative film as an example:

(4-I) In the time period of $t_1<t<t_2$, application of the shift gate pulse φS is continued in all sensor sections 52a to 52c. Accordingly, the shift gates 54 of the sensor sections 52a to 52c of colors are all opened and the unnecessary charges occurring in the photoelectric conversion element groups 51 of the sensor sections 52a to 52c are transferred in sequence to the shift registers 56 as shown in FIGS. 10A to 10C. In the time period of $t_1<t<t_2$, the drive pulses φD are applied to the shift registers 56 of the sensor sections 52a to 52c of colors. Accordingly, in the shift registers 56 of the sensor sections 52a to 52c, the unnecessary charges are transferred to the output sections 57 as shown in FIGS. 10A to 10C. In the time period of $t_1<t<t_2$, in the sensor sections 52a to 52c of colors, the unnecessary charges are transferred from the shift registers 56 to the output sections 57 by predetermined pulse application.

Figure 11A:
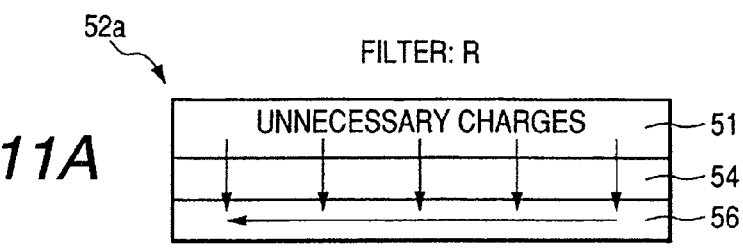
FIGS. 11A to 11C are schematic drawings to describe the drive method of the CCD color image sensor according to the embodiment of the invention.
Figure 11B:
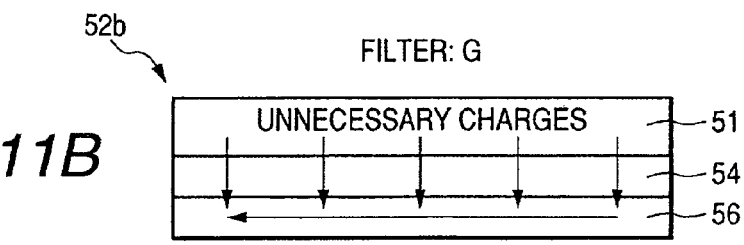
Figure 11C:
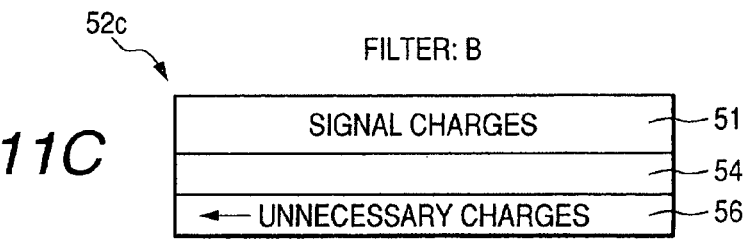

(4-II) At $t=t_2$, application of the shift gate pulse φS to the sensor section 52c provided with the B filters 58 is stopped. In the time period of $t_2<t<t_3$, the shift gate pulse φS is not applied to the sensor section 52c to shut the shift gate 54 for accumulating the charges (signal charges) in the photoelectric conversion element group 51 as shown in FIG. 11C. At $t=t_2$, the unnecessary charges are left in the shift register 56 of the sensor section 52c. Therefore, during the time period of $t_2<t<t_3$, during the time period of $t_2<t<t_5$ if necessary, the drive pulse φD, etc., is applied to the sensor section 52c for transferring the remaining unnecessary charges in the shift register 56 and sending the unnecessary charges to the output section 57 as shown in FIG. 1C. During the time period of $t_2<t<t_3$, in the sensor sections 52a and 52b, application of the shift gate pulse φS is continued and the drive pulse φD, etc., is applied, thereby transferring the unnecessary charges from the photoelectric conversion element groups 51 to the output sections 57 as shown in FIGS. 11A and 11B.

Figure 12A:
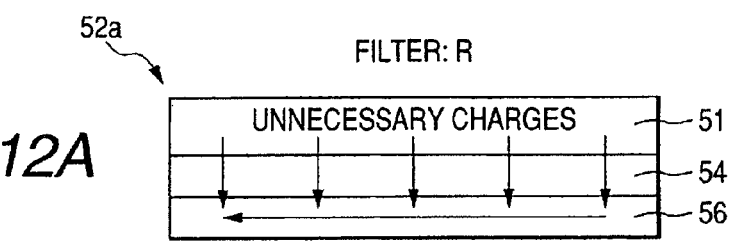
FIGS. 12A to 12C are schematic drawings to describe the drive method of the CCD color image sensor according to the embodiment of the invention.
Figure 12B:
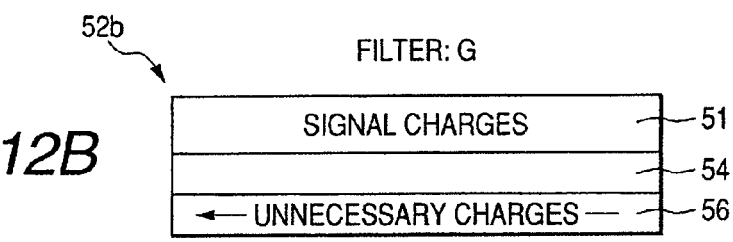
Figure 12C:
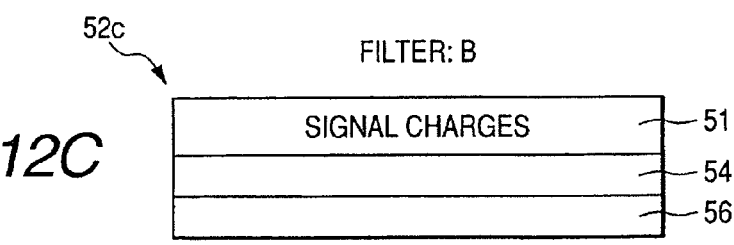

(4-III) At $t=t_3$, application of the shift gate pulse φS to the sensor section 52b provided with the G filters 58 is stopped. In the time period of $t_3<t<t_4$, the shift gate pulse φS is not applied to the sensor section 52b or 52c to shut the shift gates 54 for accumulating the charges (signal charges) in the photoelectric conversion element groups 51 as shown in FIGS. 12B and 12C. At $t=t_3$, the unnecessary charges are left in the shift register 56 of the sensor section 52b. Therefore, during the time period of $t_3<t<t_4$, during the time period of $t_3<t<t_5$ if necessary, the drive pulse φD, etc., is applied to the sensor section 52b for transferring the remaining unnecessary charges in the shift register 56 and sending the unnecessary charges to the output section 57 as shown in FIG. 12B. During the time period of $t_3<t<t_4$, in the sensor section 52a, application of the shift gate pulse φS is continued and the drive pulse φD, etc., is applied, thereby transferring the unnecessary charges from the photoelectric conversion element group 51 to the output section 57 as shown in FIG. 12A.

Figure 13A:
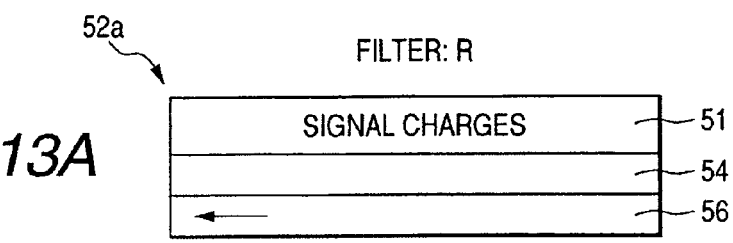
FIGS. 13A to 13C are schematic drawings to describe the drive method of the CCD color image sensor according to the embodiment of the invention.
Figure 13B:
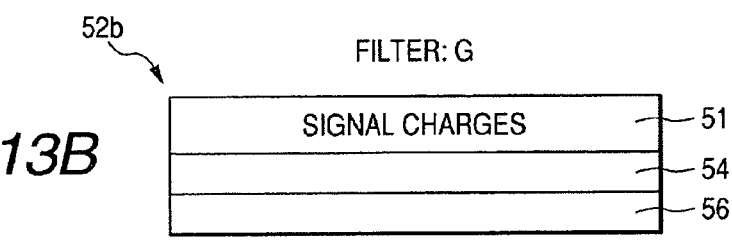
Figure 13C:
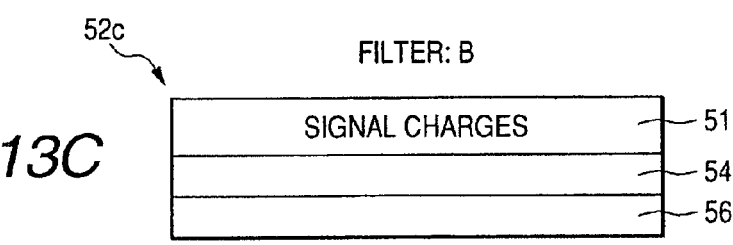
Figure 14:
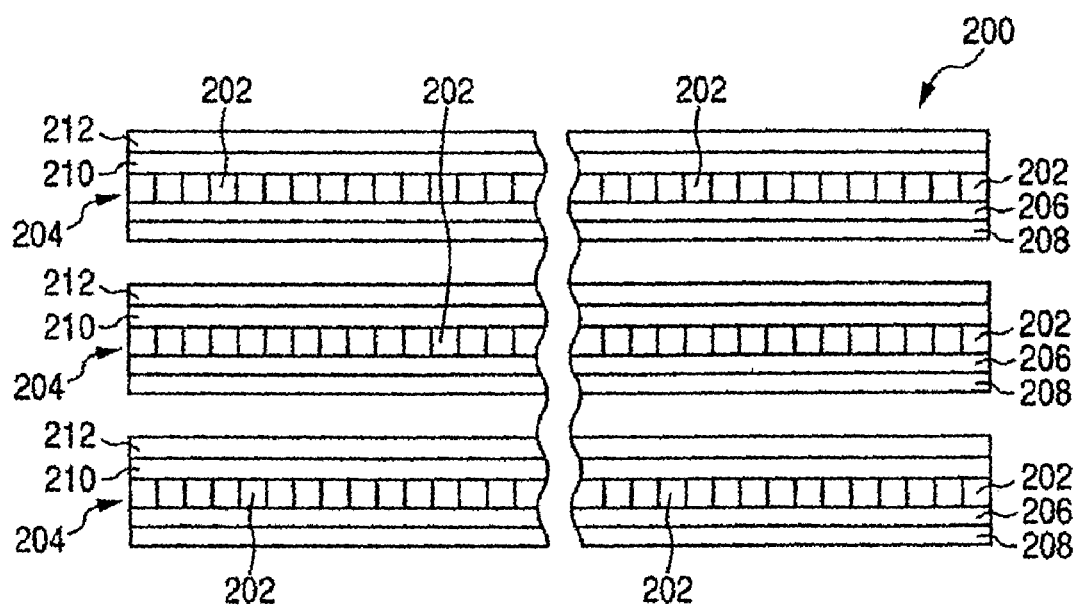
FIG. 14 is a plan view to schematically show a CCD color image sensor in a related art.

(4-IV) At $t=t_4$, application of the shift gate pulse φS to the sensor section 52a provided with the R filters 58 is stopped. In the time period of $t_4<t<t_5$, the shift gate pulse φS is applied to none of the sensor sections 52a to 52c to shut the shift gates 54 for accumulating the charges (signal charges) in the photoelectric conversion element groups 51 as shown in FIGS. 13A to 13C. At $t=t_4$, the unnecessary charges are left in the shift register 56 of the sensor section 52a. Therefore, during the time period of $t_4<t<t_5$, the drive pulse φD, etc., is applied to the sensor section 52a for transferring the remaining unnecessary charges in the shift register 56 and sending the unnecessary charges to the output section 57 as shown in FIG. 13A.

Thus, in the embodiment, in the sensor section 52a for R, the signal charges are accumulated in the time period of $t_4<t<t_5$ and the unnecessary charges are transferred during the time period; in the sensor section 52b for G, the signal charges are accumulated in the time period of $t_3<t<t_5$ longer than the time period in the sensor section 52a and the unnecessary charges are transferred during that time period; and further in the sensor section 52a for B, the signal charges are accumulated in the time period of $t_2<t<t_5$ longer than the time period in the sensor section 52a, 52b and the unnecessary charges are transferred during that time period. The drive pulses φD are applied to the shift registers 56 of the sensor sections 52a, 52b, and 52c in a similar manner regardless of the transfer time of the unnecessary charges or the transfer time of the signal charges.

(5) At $t=t_5$, the shift gate pulses φS are applied to the shift gates 54 of the sensor sections 52a to 52c of colors to open all the shift gates 54, thereby terminating accumulation of the signal charges in all of the sensor sections 52a to 52c. That is, application of the shift gate pulses φS at $t=t_5$ becomes application of shift gate pulses φS at next $t=t_0$. Scanning of the CCD color image sensor 20 over one line is now complete.

According to the drive method of the CCD color image sensor 20 described above, the signal charges can be accumulated in the photoelectric conversion element groups 51 of the sensor sections 52a to 52c of colors in different time periods according to the colors and in addition, the unnecessary charges are transferred to the shift register 56 and further transferred from the shift register 56 to the output section 57 in the accumulation time period of the signal charges, etc., in each sensor section 52a-52c, whereby the unnecessary charges can be discarded.

While the embodiment of the invention has been described in detail, such description is for illustrative purposes only, and it is to be understood that the invention is not limited to the described embodiment thereof.

For example, in the description given above, the accumulation times of the signal charges in the photoelectric conversion element groups of R, G, and B colors are set so that they are prolonged in the order of R, G, and B, but the duration order of the charge accumulation times may be set appropriately in response to the type of original to be read, for example, or may be set so that the charge accumulation times become the same depending on the type of original.

In the description given above, the invention is applied to the linear image sensor having each shift gate and each shift register only on one side along the rows of the photoelectric conversion element groups, but the invention can also be applied to a linear image sensor having each shift gate and each shift register on both sides along the rows of the photoelectric conversion element groups for reading charges on both the sides.

Further, in the description given above, the invention is applied to the flat-bed image scanner, but can also be applied to color image input apparatus such as a sheet feed image scanner, copier, multiple function processing machine, and a digital camera.

What is claimed is:

1. A drive method of a CCD color image sensor comprising a plurality of sensor sections, each of which has a color filter different from each other and each of which comprises: a photoelectric conversion element group, operable to receive light so as to generate charge including signal charge and unnecessary charge based on the light and operable to accumulate the charge; a shift register, operable to transfer the charge to an output section; and a shift gate, arranged between the photoelectric conversion element group and the shift register, the drive method comprising:

transferring the signal charge accumulated in each photoelectric conversion element group to each shift register by opening each shift gate transferring the signal charge from the shift register to the output section in a state that the shift gate is closed;

transferring the unnecessary charge in the photoelectric conversion element group to the shift register and the unnecessary charge from the shift register to the output section in a state that the shift gate is opened; and transferring the unnecessary charge from the shift register to the output section while accumulating the signal charge in the photoelectric conversion element group in a state that the shift gate is closed, wherein the signal charge is transferred from the shift register to the output section in a time period that is set for each sensor section and is different for each sensor section.

2. A color image input apparatus comprising:

a CCD color image sensor, comprising a plurality of sensor sections, each of which has a color filter different from each other and each of which comprises:

a photoelectric conversion element group, operable to receive light so as to generate charge including signal charge and unnecessary charge based on the light and operable to accumulate the charge;

a shift register, operable to transfer the charge to an output section;

a shift gate, arranged between the photoelectric conversion element group and the shift register; and a controller that transfers the signal charge accumulated in each photoelectric conversion element group to each shift register by opening each shift gate;

transfers the signal charge from the shift register to the output section in a state that the shift gate is closed;

transfers the unnecessary charge in the photoelectric conversion element group to the shift register and the unnecessary charge from the shift register to the output section in a state that the shift gate is opened; and transfers the unnecessary charge from the shift register to the output section while accumulating the signal charge in the photoelectric conversion element group in a state that the shift gate is closed, wherein the signal charge is transferred from the shift register to the output section in a time period that is set for each sensor section and is different for each sensor section.

* * * * *